United States Patent [19]
Kishine et al.

[11] Patent Number: 4,811,152
[45] Date of Patent: Mar. 7, 1989

[54] PROTECTIVE STRUCTURE FOR JACKET FOR ROTATABLE MAGNETIC RECORDING MEDIA

[75] Inventors: Nobuyuki Kishine, Utsunomiya; Megumu Hirakura, Matsudo; Tetsuya Imamura, Tokyo, all of Japan

[73] Assignee: KAO Corporation, Tokyo, Japan

[21] Appl. No.: 902,883

[22] Filed: Sep. 2, 1986

[30] Foreign Application Priority Data

Sep. 2, 1985 [JP] Japan .................. 60-134173[U]

[51] Int. Cl.$^4$ .............................................. G11B 23/02
[52] U.S. Cl. .................................................. 360/133
[58] Field of Search ............... 369/291, 292, 289; 206/444, 309, 312, 313; 360/60, 128, 132, 133, 137

[56] References Cited

U.S. PATENT DOCUMENTS

| | | | |
|---|---|---|---|
| 4,038,693 | 7/1977 | Huffine et al. | 360/133 X |
| 4,185,314 | 1/1980 | Hatchett et al. | 360/133 |
| 4,375,658 | 3/1983 | Martinelli | 360/128 |
| 4,443,874 | 4/1984 | Steenberg | 369/291 |
| 4,473,153 | 9/1984 | Colangelo | 206/312 |
| 4,558,386 | 12/1985 | Kara | 360/128 |
| 4,618,061 | 10/1986 | Rubenfeld | 206/444 |
| 4,622,607 | 11/1986 | Smith | 360/133 X |
| 4,660,116 | 4/1987 | Westfall et al. | 360/132 |
| 4,695,911 | 9/1987 | Loosen | 360/133 |

FOREIGN PATENT DOCUMENTS

| | | | |
|---|---|---|---|
| 0144783 | 6/1985 | European Pat. Off. | 360/133 |
| 2743291 | 4/1979 | Fed. Rep. of Germany | 206/312 |
| 60-242562 | 12/1985 | Japan | 206/309 |

*Primary Examiner*—John H. Wolff
*Attorney, Agent, or Firm*—Cushman, Darby & Cushman

[57] ABSTRACT

This invention provides an inexpensive structure for a protecting jacket for rotatable magnetic recording media which has a dimension sufficient to cover openings on the jacket and is provided as a sheet adhered to the jacket to cover said openings and prevent entry of dust.

14 Claims, 5 Drawing Sheets

PROTECTIVE STRUCTURE FOR JACKET FOR ROTATABLE MAGNETIC RECORDING MEDIA

BACKGROUND

This invention relates to a jacket for rotatable magnetic recording medium and more particularly to a protective structure for the jacket which can prevent dust from entering the jacket.

Rotatable magnetic sheets (generally known as floppy discs) are widely used as media for magnetic recording and reproducing in recent years. These rotatable magnetic sheets are usually sheathed in a package (referred to as a jacket hereinafter) provided with internal liners made of non-woven fabric. The jacket has an opening at the center thereof for rotating the magnetic sheet, an opening for contacting the rotatable magnetic sheet with a magnetic head and an opening for displaying sectors. Dust in the air tends to enter the jacket through these openings to contaminate the surface of the magnetic sheet, and cause errors.

Such a jacket is usually placed in an envelope for protecting it mainly from such dust. However, as such an envelope covers only two thirds or three fourths of the surface of the jacket and is not closely attached to said opening of the jacket, dust in the air cannot be fully prevented from entering the jacket into the envelope.

Moreover, the jacket is taken out from the envelope when a user wishes to use the rotatable magnetic sheet therein, and the user tends to throw away the envelope. The openings of a jacket are often exposed to the air when such sheet is stored for a long time.

The material of such an envelope was mainly made of natural paper in the prior art, but recently they are often made of synthetic paper such as of polyethylene (e.g. TYVEK Manufactured by DuPont).

When we consider cost-wise a product comprising a rotatable magnetic sheet, a jacket and a protective envelope, the cost of the envelope is by no means negligible and it is not quite effective in preventing dust.

BRIEF SUMMARY OF THE INVENTION

This invention provides a protective structure for the jackets of rotatable recording medium which can almost completely prevent dust in the air from entering the jackets and yet is low in cost.

The protective structure for rotatable recording medium jackets according to this invention is characterized in that a protective sheet which is applied with adhesive on one surface thereof covers at least an opening of the jacket for driving the magnetic recording medium therein and an opening for contacting the magnetic recording medium with a magnetic head out of the aforementioned various openings on the jackets. As these openings are bored on both sides of a jacket, it is desirable for the structure to cover them from both sides. Two notches are provided near the opening for contacting the medium with the magnetic head. They are preferably covered with the protective structure together with the opening.

The protective sheet may be in any form so long as it can effectively cover the openings of the jacket.

The openings of a jacket are covered with such a protective sheet to prevent dusts from entering them. When recording or reproducing is desired, such protective sheet should be peeled off.

DETAILED DESCRIPTION OF THE INVENTION

The invention is now explained referring to embodiments shown in the attached drawings. This invention, however, is by no means limited to these illustrated embodiments.

Figure 1:
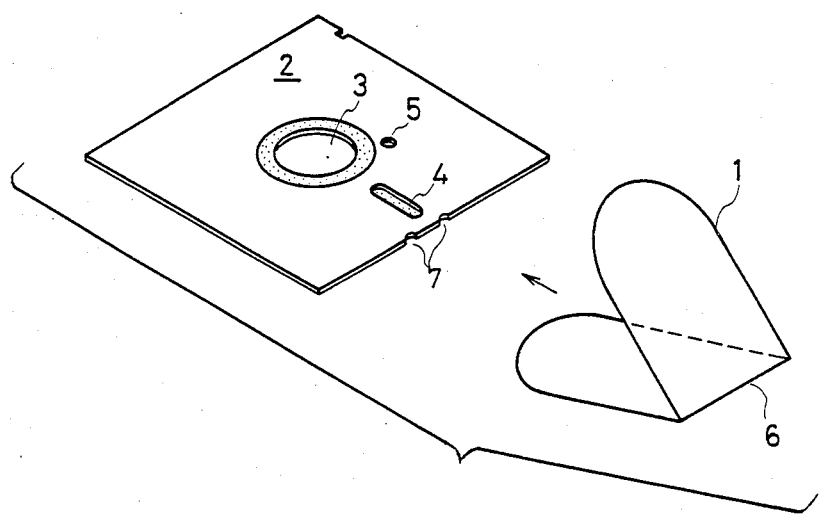
FIG. 1 is a perspective view to show an embodiment of this invention.
Figure 2:
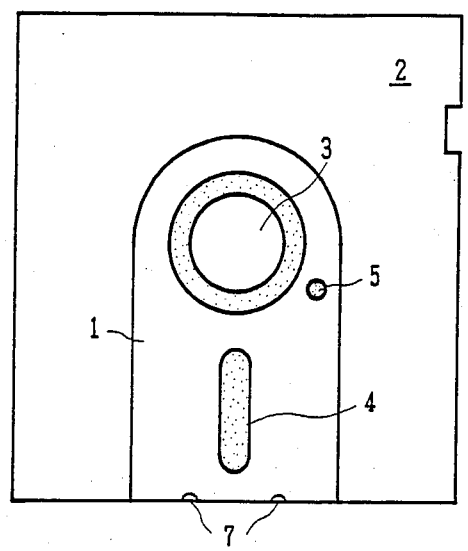
FIG. 2 is a plan view of FIG. 1.
Figure 3:
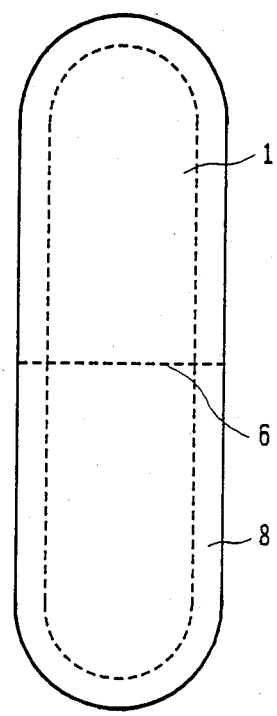
FIG. 3 is a developed view of the protective sheet of FIG. 2.

FIG. 1 is a perspective view showing an embodiment of this invention and more particularly showing the state of the protective sheet 1 when it is folded before being adhered to a jacket 2. FIG. 2 is a plan view of the protective sheet 1 when pasted on a jacket 2. The protective sheet 1 covers an opening 3 for driving a rotatable magnetic recording medium, an opening 4 for contacting the rotatable magnetic sheet with a magnetic head and an opening 5 for displaying sectors out of various openings on the jacket. FIG. 3 is a developed view of the protective sheet. The protective sheet 1 is substantially a rectangle having semi-circles respectively on both short sides or ends thereof. The rounded portions are for covering the opening 3 at the center of the jacket 2 for driving the rotatable magnetic sheet. A folding line 6 exists at the center of the protective sheet 1. The sheet 1 is folded on the line 6 symmetrically to cover the opening on the jacket from both sides in a manner shown in FIG. 1, and it also covers notches 7. The protective sheet 1 may be made of synthetic paper and is applied with adhesive on the surface which contacts with the jacket for snug attachment.

If adhesive is applied only on the peripheral portion 8 of the sheet 1 as shown by a broken line in FIG. 3, the rotatable magnetic sheet which is exposed through the openings on the jacket 2 will be free of such adhesive.

Figure 4:
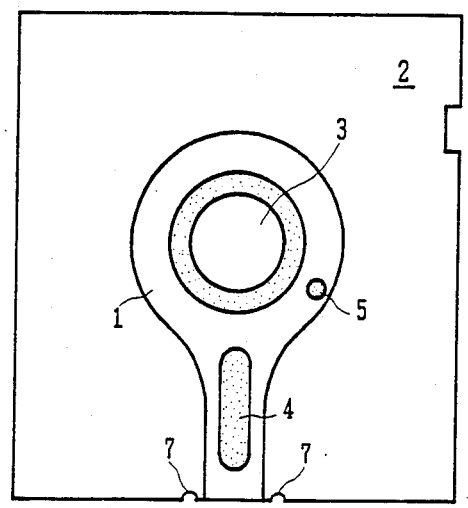
FIG. 4 is a plan view of a second embodiment of this invention.
Figure 5:
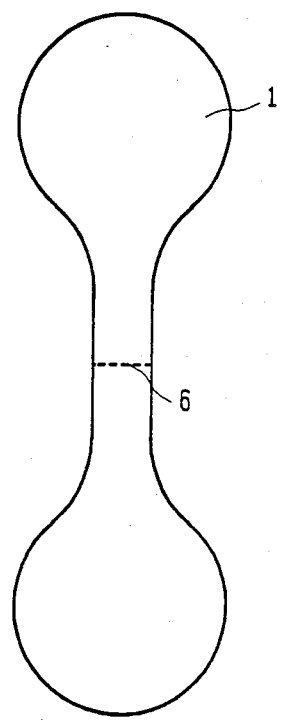
FIG. 5 is a developed view of the protective sheet of FIG. 4.

FIGS. 4 and 5 show another embodiment of this invention. The protective sheet according to this embodiment is shaped like a dumbbell or two circles connected by a rectangle. The circular portions are for covering the opening 3 for driving the rotatable magnetic sheet and the opening 5 for displaying sectors while the rectangular portion together with the circular portions are to cover the opening 4 for contacting the rotatable magnetic sheet with the magnetic head. This protective sheet, however, does not cover notches 7 of the jacket 2. The protective sheet may be made of natural paper and the surfaces contacting the jacket 2 are applied with adhesive.

Figure 6:
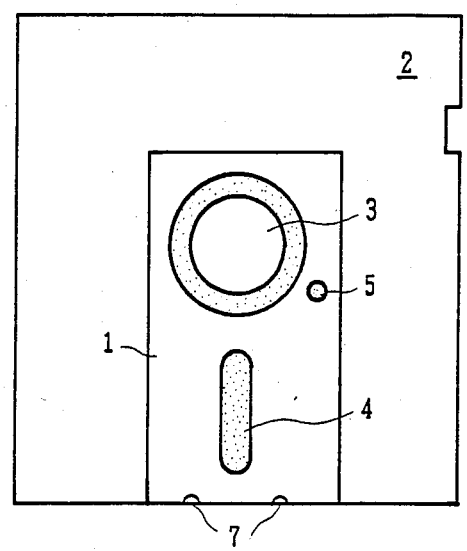
FIG. 6 is a plan view of a third embodiment of this invention.
Figure 7:
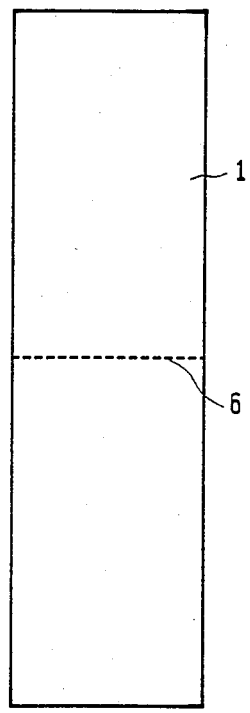
FIG. 7 is a developed view of the protective sheet of FIG. 6.

FIGS. 6 and 7 show the third embodiment of this invention. This protective sheet according to this embodiment is formed in a rectangle which is to be folded symmetrically at the center folding line 6 to cover the opening 3 for driving the magnetic sheet, the opening 4 for contacting the sheet with the magnetic head and the opening 5 for displaying sectors from both sides of the jacket. The protective sheet 1 may be made of a thin plate of polyvinyl chloride mixed with carbon black which is an antistatic agent. Magnetic recording media can be effectively protected by the antistatic agent from faults which might otherwise be caused electrostatically.

Figure 8:
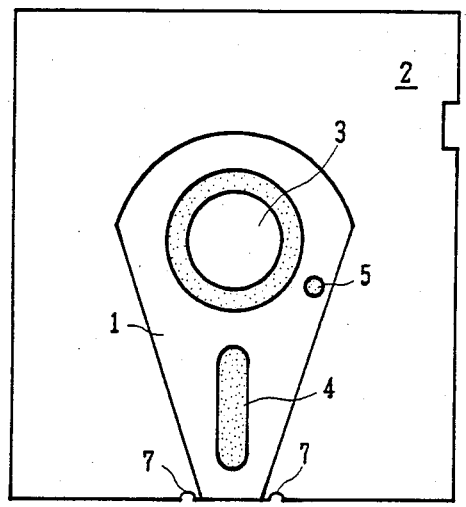
FIG. 8 is a plan view of a fourth embodiment of this invention.
Figure 9:
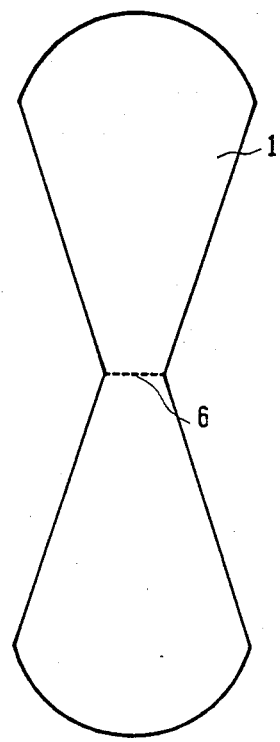
FIG. 9 is a developed view of the protective sheet of FIG. 8.

FIGS. 8 and 9 show the fourth embodiment of this invention. This protective sheet 1 is formed in two sectors which is folds symmetrically at the folding line 6 from which it diverges to rounded ends to cover the opening 3 for driving the rotatable magnetic sheet, the opening 4 for contacting the magnetic sheet with the magnetic head and the opening 5 for displaying sectors. This protective sheet does not cover openings of notches 7 on the jacket 2.

This invention provides a protective structure which covers a jacket with a protective sheet. When a rotatable magnetic recording medium in the jacket is used for recording or reproducing, the protective sheet is peeled off from the jacket and then the jacket is inserted in a magnetic disc unit or the like.

When such a rotatable magnetic recording medium must be stored for a long time after use, the protective sheet according to this invention, if adhered to the jacket, can effectively protect the medium from dust in the air. This protective sheet has a strip of releasing paper on the surface applied with adhesive. The releasing paper may be peeled off and stuck on a jacket while the jacket is being stored.

While various materials are mentioned above relative to the different embodiments, the invention is not limited to a particular material for a particular configuration of the protective sheet. In fact, the material of a protective sheet according to this invention may be paper (natural or synthetic) or resins, and possibly textile, metal, etc. Protective sheets are punched out from thin metal plates or cut out of textile. But when ease of use, effect in prevention of dust, weight and costs are comprehensively considered, paper or resin is preferable as the material of protective sheets.

Antistatic agents or various pigments may, if possible, be mixed in the material for protective sheets. Antistatic agents can prevent faults otherwise caused by electrostatics while pigments can make sheets colorful for easy identification as well as better classification.

The invention can almost completely prevent dust in the air from entering a jacket containing a rotatable magnetic recording medium with an inexpensive protective sheet. The protective sheet of this invention can serve for convenience of users as it can present dust from entering the jacket by a simple structure when users wish to keep recording media for a long time.

What we claim is:

1. A protective structure for a jacket which contains a rotatable disc type recording medium and which has an opening for driving the magnetic recording medium and an opening for contacting the magnetic recording medium with a magnetic head, comprising a protective sheet, one surface of which has an adhesive along a peripheral portion thereof for securing the sheet to said jacket to cover both said drive opening and said contact opening, said protective sheet having a longitudinal axis and a transverse fold line defined at a midpoint of said longitudinal axis, said protective sheet being symmetrical about said transverse fold line so that when said protective sheet is adhesively secured to said jacket with said transverse fold line disposed parallel to a side edge of said jacket, each symmetrical half of said protective sheet will be disposed in a plane parallel to a plane of said recording medium and to each other and so that a half of said protective sheet covers both said drive opening and said contact opening.

2. A protective structure as in claim 1 wherein said jacket also has an opening for displaying sectors and said protective sheet has a structure for covering said opening for displaying sectors.

3. A protective structure as in claim 2 wherein said jacket has openings on first and second sides thereof for driving the magnetic recording medium, for contacting the magnetic recording medium with a magnetic head and for displaying sectors, said protective sheet extending longitudinally so as to cover said openings on said first and second sides of said jacket.

4. A protective structure as in claim 1 wherein said jacket has notched portions and said protective sheet has structure for covering said notched portions.

5. A protective structure as in claim 1 wherein said jacket has openings on first and second sides thereof for driving the magnetic recording medium, for contacting the magnetic recording medium with a magnetic head and for displaying sectors, said protective sheet extending longitudinally so as to cover said openings on said first and second sides of said jacket.

6. A protective structure as in claim 5 wherein said protective sheet extends as a rectangle.

7. A protective structure as in claim 5 wherein said protective sheet has substantially parallel longitudinal side edges and substantially semi-circular ends.

8. A protective structure as in claim 5 wherein said protective sheet has the general shape of a dumbbell.

9. A protective structure as in claim 5 wherein said protective sheet has a width which gradually increases from a longitudinally central portion thereof towards each end thereof and has rounded outer ends.

10. A protective structure as in claim 1 including a releasable cover on said adhesive which can be peeled off to expose said adhesive before the sheet is adhered to said jacket.

11. A protective structure as in claim 1 wherein said sheet is made of one of the following: natural paper, synthetic paper, textile material, metal, resin.

12. A protective structure as in claim 1 wherein said sheet is made of a polyvinyl chloride mixed with carbon black.

13. A protective structure as in claim 1 wherein said sheet includes an antistatic agent.

14. A protective structure as in claim 1 wherein said sheet contains coloring pigment.

* * * * *